United States Patent [19]

McDonald

[11] Patent Number: 4,636,673
[45] Date of Patent: Jan. 13, 1987

[54] FLEXIBLE MOUNTING SYSTEM FOR ELECTRIC MOTORS

[75] Inventor: George M. McDonald, Liberty Township, Hardin County, Ohio

[73] Assignee: A. O. Smith Corporation, Milwaukee, Wis.

[21] Appl. No.: 737,746

[22] Filed: May 24, 1985

[51] Int. Cl.⁴ .................................................. H02K 5/00
[52] U.S. Cl. ...................................... 310/91; 417/363
[58] Field of Search .......................... 74/526; 29/529; 248/603, 604, 675; 310/89, 91, 42; 417/360, 361, 363, 423

[56] References Cited

U.S. PATENT DOCUMENTS

| | | | |
|---|---|---|---|
| 2,317,922 | 4/1943 | Lear | 310/91 X |
| 2,863,602 | 12/1958 | Chapin | 417/363 |
| 3,043,970 | 7/1962 | Hatten et al. | 310/91 |
| 3,159,108 | 12/1964 | Mullings | 310/91 |
| 3,401,870 | 9/1968 | Crowe | 417/363 |
| 4,161,667 | 7/1979 | Buckman et al. | 310/91 |

FOREIGN PATENT DOCUMENTS

| | | | |
|---|---|---|---|
| 662358 | 4/1963 | Canada | 417/363 |
| 941081 | 12/1948 | France | 310/89 |

*Primary Examiner*—Patrick R. Salce
*Assistant Examiner*—D. L. Rebsch
*Attorney, Agent, or Firm*—Andrus, Sceales, Starke & Sawall

[57] ABSTRACT

A mounting assembly for an electric motor includes a plurality of mounting arms, each having a first portion extending in a generally radial direction with respect to a central axis of an associated electric motor and a base portion extending longitudinally in a direction parallel to the central axis. One end of the base portion is rigidly attached to the motor, and a tab on a second end of the base portion is inserted into a tab receptacle. The position along the mounting arm base to which the radially extending portion is attached can be varied in order to control the motor location in an axial direction.

13 Claims, 8 Drawing Figures

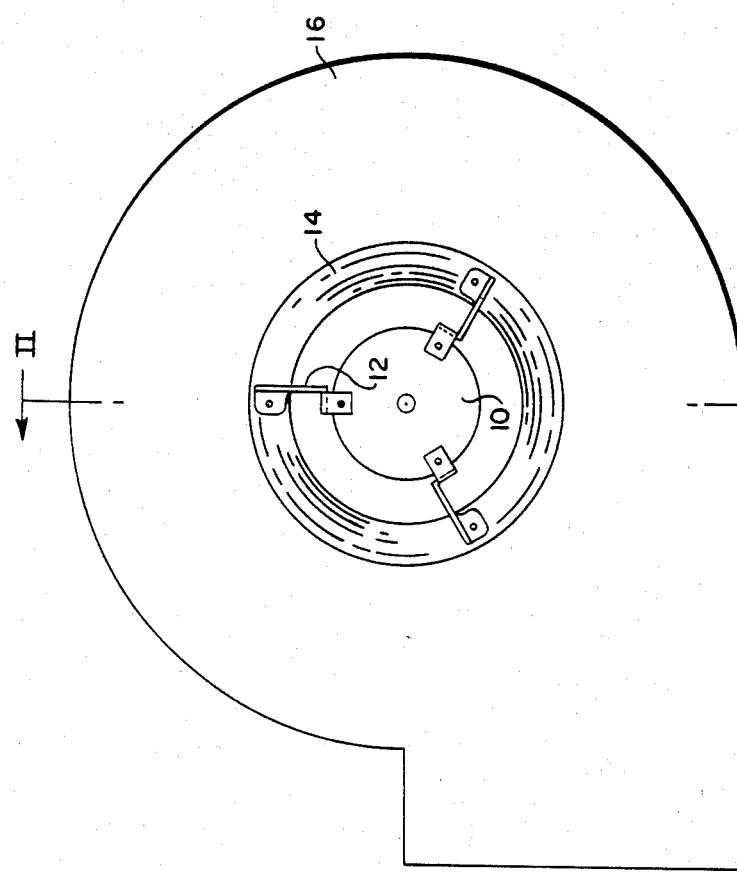
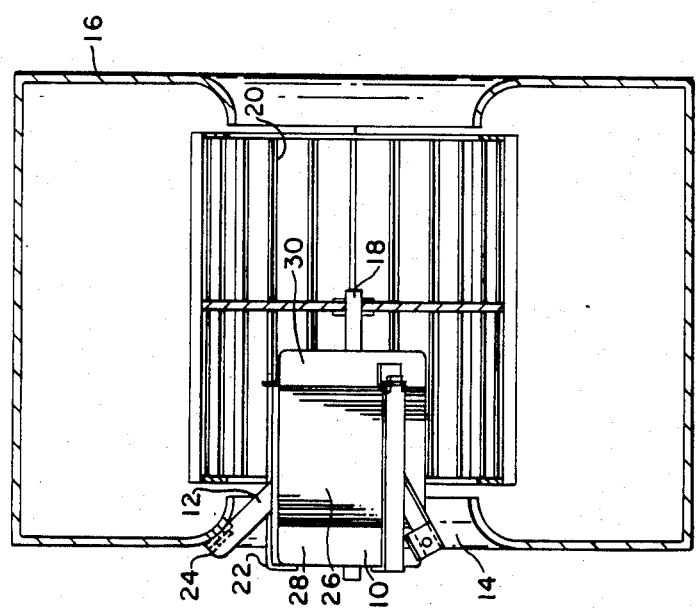
FIG. 2
FIG. 1

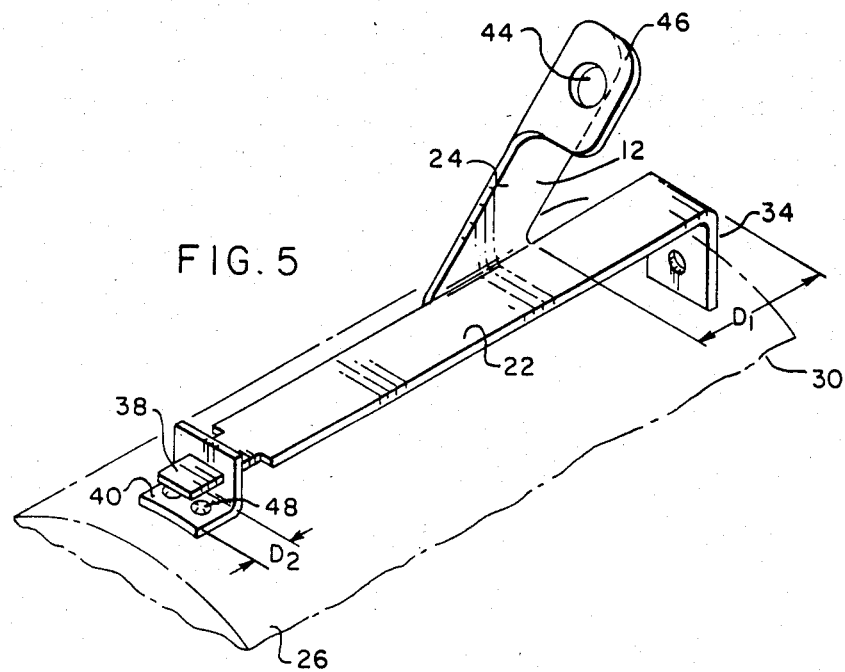
FIG. 5
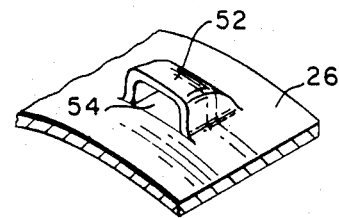
FIG. 6
FIG. 7
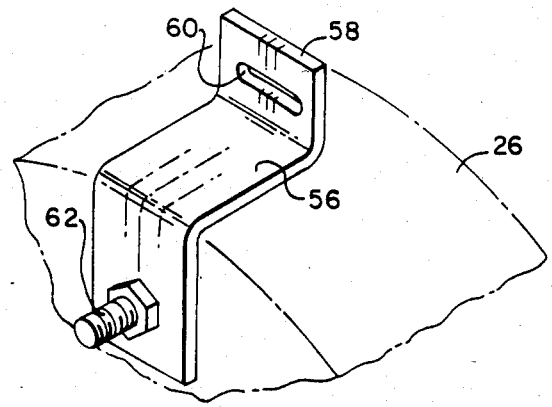
FIG. 8

FLEXIBLE MOUNTING SYSTEM FOR ELECTRIC MOTORS

BACKGROUND OF THE INVENTION

This invention relates to mounting systems for electric motors and, more particularly, to systems for mounting such motors in blower assemblies.

Blower-motor mounting assemblies which include a plurality of mounting arms that extend radially from a motor frame to a blower housing are well known. One such arrangement includes flexible mounting arms having a low spring constant with respect to the torsional mode of vibration and being relatively stiff with respect to axial and tilting mode vibrations. Such mounting arms are generally inflexibly attached to a motor frame or, alternatively, attached to a band which extends around the motor.

One type of motor construction includes an open stator and a pair of end bells mounted to each end of the stator. For motors of that type of construction, it is impossible to weld or bolt the mounting arms to the exposed stator laminations. Therefore, the mounting arms must be attached to the end bells or a mounting band must be used. Neither of the systems is completely satisfactory, since attaching the arms to the end bells limits the range of available axial motor mounting positions and the use of a band significantly adds to the cost of the mounting system. It is, therefore, desirable to design a motor mounting arrangement which maintains the vibration reduction characteristics of the prior art flexible mounting arms while providing a greater range of motor mounting positions in the axial direction.

SUMMARY OF THE INVENTION

The present invention includes a system for mounting electric motors in blower assemblies wherein a plurality of flexible mounting arms can be located at any position along the motor length. A mounting assembly for an electric motor constructed in accordance with this invention comprises a plurality of mounting arms, each having a first portion extending in a generally radial direction with respect to a central axis of an associated electric motor and a second or base portion extending longitudinally in a direction parallel to the central axis. Each of the base portions includes one end which is rigidly attached to the motor and a tab extending from a second end. A plurality of tab receptacles are rigidly attached to the motor and each receptacle includes an opening for receiving one of the base portion tabs.

Due to manufacturing tolerances, motors are subject to slight length variations. Through the use of a mounting tab which extends into an opening of a tab receptacle, the present invention easily accommodates such motor length variations. By adjusting the connection point between the first portion and the base portion of each mounting arm, the location along the motor from which the first portions extend can be easily adjusted.

The present invention also includes a method of mounting an electric motor to a support structure comprising the steps of rigidly attaching a first end of a longitudinally extending base portion of one of a plurality of mounting arms to a first point on the surface of an electric motor and inserting a tab on a second end of the base portion into one of a plurality of tab receptacles, wherein the tab receptacles are fixed with respect to a second point on the motor surface and wherein the second point is longitudinally spaced along the motor surface from the first point. Radially extending portions of the mounting arms, which are attached to an intermediate section of the longitudinally extending base portions, are subsequently attached to the support structure.

BRIEF DESCRIPTION OF THE DRAWINGS

FIG. 1 is a somewhat schematic representation of a motor-blower assembly constructed in accordance with one embodiment of the present invention;

FIG. 2 is a cross section of the assembly of FIG. 1 taken along lines II—II;

FIG. 5 is an enlarged perspective view of a motor mounting arm constructed in accordance with this invention; and FIGS. 6, 7 and 8 represent alternative embodiments of a mounting tab receptacle for use with the mounting arms of this invention.

DESCRIPTION OF THE PREFERRED EMBODIMENTS

Figure 3:
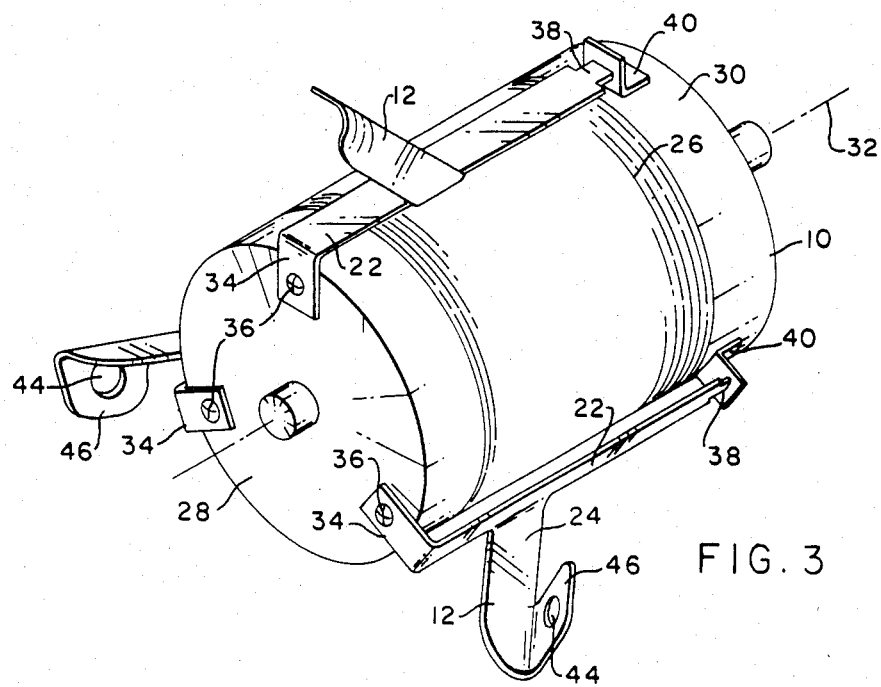
FIG. 3 is a perspective view of a motor mounting assembly constructed in accordance with the present invention.

Referring to the drawings, FIG. 1 is a somewhat schematic representation of a motor-blower assembly constructed in accordance with one embodiment of the present invention. A motor 10 in this direct-drive blower assembly is connected by a plurality of mounting arms 12 to a scroll portion 14 of a blower housing 16. As shown in FIG. 2, the motor 10 extends axially into the blower housing 16 and includes a shaft 18 which is connected to a blower wheel 20. Each mounting arm 12 includes a longitudinally extending base portion 22 and a generally radially extending portion 24. The radially extending portion is connected to the base portion at an intermediate location. The motor 10 in FIG. 2 does not include a continuous frame but rather includes an exposed stator stack 26 and a pair of end bells 28 and 30 mounted on opposite ends of the stator stack. The unique mounting arm construction of this invention allows the generally radially extending portion 24 of the mounting arm to extend from a position on the base portion 22 which is adjacent to the exposed stator stack 26.

FIG. 3 is a perspective view of a motor having a plurality of mounting arms constructed in accordance with this invention. In this Figure, the base portions 22 of the mounting arms 12 can be seen to extend longitudinally in a direction parallel to the motor axis 32. Each base portion includes a first end 34 which is rigidly attached to one end of the motor 10 by, for example, through bolts 36. The opposite end of the arm base portions includes a longitudinally extending tab 38 which passes through an opening in a tab receptacle 40. The tab receptacle openings are sized such that the tabs form an interference fit with the sides of the openings to prevent radial or circumferential movement of the tabs.

In the preferred embodiment, the mounting arms are fabricated from mild sheet steel or spring steel and the base portions have a width in the circumferential direction which is substantially greater than the thickness in the radial direction. The base portions exhibit minor torsional flexibility in comparison to the radially extending portions. To prevent contact of the base portions and the external surface of the motor, a radial clearance of about 0.01 inch should be maintained between the mounting arm base and the motor surface.

Figure 4:
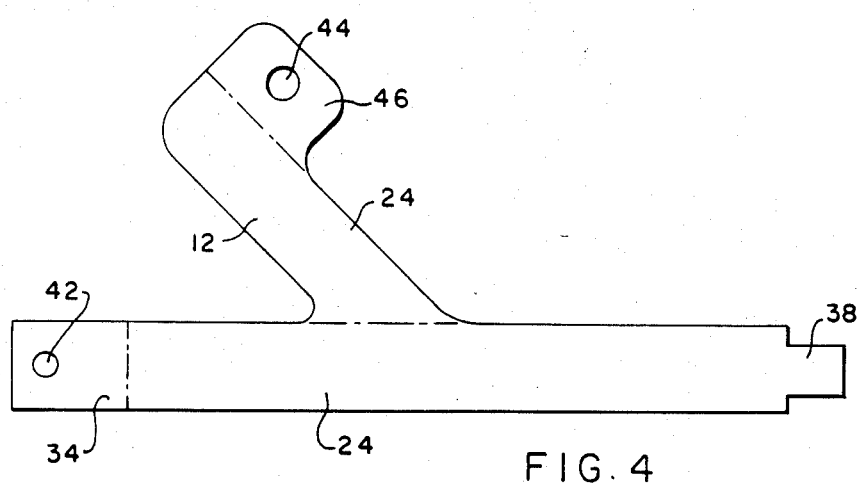
FIG. 4 is a plan view of a blank used in the manufacture of the mounting arms of FIG. 3.

FIG. 4 is a plan view of a blank used in the manufacture of one of the motor mounting arms 12 of FIG. 3. In FIG. 4, a first hole 42 is shown to be positioned in a first end 34 of the base portion 22 for receiving a mounting device which rigidly attaches end 34 to the motor. A second hole 44 is shown in an end portion 46 of the radially extending arm portion 24 for receiving a mounting device, such as a bolt, that is used to attach the mounting arm to the blower housing.

FIG. 5 is an enlarged perspective view of one of the mounting arms of FIG. 3 shown from the opposite direction. This Figure illustrates that the distance $D_1$ between the bend near the first end 34 of the mounting arm base 22 and the radially extending portion 24 of the mounting arm can be changed to change the location of the radially extending portions of the mounting arm with respect to the exterior motor surface. If the distance between the radially extending mounting arm portion and the end of tab 38 is not changed to accommodate any change in $D_1$, then the length $D_2$ of the base portion of tab receptacle 40 can be changed to accommodate any change in $D_1$. This Figure also shows that tab receptacle 40 is mounted to motor end bell 26 by way of welds 48.

FIG. 6 is a plan view of a blank used to form tab receptacle 40. The opening 50 in this blank can be seen to have an arcuate shape that corresponds to the arcuate cross section of the tab 38 which extends from the base 22 of mounting arm 12. FIG. 7 shows an alternative embodiment of the tab receptacle wherein a lanced section 52 of end bell 26 has been upset in a radially outward direction to form an opening 54 adjacent to the inside end of the lanced section, for receiving tab 38 on the mounting arm 12.

FIG. 8 shows yet another alternative embodiment of the tab receptacle 56 having a radially extending portion 58 defining a tab receiving aperture 60 and being attached to the motor end bell 26 by way of a mounting stud 62.

The method of mounting an electric motor to a support structure of this invention comprises the steps of rigidly attaching a first end of one of a plurality of longitudinally extending base portions of a plurality of mounting arms to a first location on the surface of an electric motor and inserting a tab on a second end of the base portion into one of a plurality of tab receptacles wherein the tab receptacles are fixed with respect to a second location on the surface of the motor and wherein each of the second locations is longitudinally spaced along the surface of the motor with respect to a corresponding one of the first locations. Each of the mounting arms includes a radially extending portion which is attached to an intermediate section of the base portion and is subsequently attached at its opposite end to the motor support structure.

Since prior art mounting arms could not be bolted or welded to an exposed impregnated stator lamination stack, the present invention permits a greater range of mounting positions than were permitted by the prior art. The mounting arms of this invention are not permanently attached to the motor. Therefore, they can be easily replaced in the event of a failure. In addition, they can be packaged separately from the motor and assembled by a customer, thereby eliminating the necessity for expensive delicate packaging. Except for the end bell receptacles, standard motor parts are used up until the final assembly operation. This simplifies the assembly operation when compared with prior art mounting arms which are required to be subassembled to the end bell or frame and may be damaged before final assembly.

Although the present invention has been described in terms of what are at present believed to be its preferred embodiments, it will be apparent to those skilled in the art that various changes may be made without departing from the scope of the invention.

What is claimed is:

1. A mounting assembly for an electric motor comprising:
    a plurality of mounting arms, each having a first generally planar portion extending in a generally radial direction with respect to a central axis of an associated electric motor and each having a second generally planar portion extending longitudinally in a direction parallel to said central axis;
    each of said first portions having a first end for connection to an external support structure, having a second end attached to a longitudinally extending edge along an intermediate section of one of said second portions, and extending radially outward from one of said second portions;
    each of said second portions including a first end and a tab extending from a second end;
    said first end of each of said second portions being rigidly attached to a first location on the surface of said electic motor;
    a plurality of tab receptacles rigidly attached to a second location on the surface of said electric motor wherein said second location is longitudinally spaced from said first location, said tab receptacles each having an opening into which one of said mounting arm tabs extends;
    wherein the width of the second portion of each of said mounting arms in a circumferential direction is substantially greater than the thickness of the second portion of each of said mounting arms in a radial direction; and
    wherein the width of the first portion of each of said mounting arms in a longitudinal direction is substantially greater than the thickness of the first portion of each of said mounting arms in a circumferential direction.

2. A mounting assembly as recited in claim 1, wherein each of said tab receptacles comprises:
    a bent pad having a radially extending section which defines said opening and having a longitudinally extending section which is rigidly attached to said electric motor.

3. A mounting assembly as recited in claim 1, wherein each of said tab receptacles comprises:
    a lanced section of an end bell of said electric motor, said lanced section being radially displaced from said end bell to form said opening.

4. A mounting assembly as recited in claim 1, wherein the tab on said second portion of each of said mounting arms has an arcuate cross section.

5. A mounting assembly as recited in claim 1, wherein the second portion of each of said mounting arms is spaced from a surface of said motor in a radial direction.

6. A mounting assembly as recited in claim 1, wherein each of said mounting arms is formed from a single sheet of metal having a bend between said first and second portions.

7. A method of mounting an electric motor to a support structure comprising the steps of:

rigidly attaching a first end of each of a plurality of generally planar, longitudinally extending portions of a plurality of mounting arms to a first plurality of points on a first end bell of an electric motor;

inserting a tab on a second end of each of said longitudinally extending portions of said mounting arms into each of a plurality of tab receptacles, wherein said tab receptacles are fixed with respect to a second plurality of points on a second end bell of said electric motor and wherein each of said second plurality of points is longitudinally spaced along the surface of said electric motor with respect to corresponding ones of said first plurality of points, such that each of said longitudinally extending portions extends between said first and second end bells of said electric motor; and attaching a first end of each of a plurality of generally planar, radially extending portions of said mounting arms to a support structure, wherein a second end of each of said generally planar, radially extending portions is attached to an intermediate section of one of said longitudinally extending portions, said intermediate section lying between said end bells in a longitudinal direction.

8. An electric motor and mounting assembly comprising:

a cylindrical laminated stator stack having a central axis;

a plurality of mounting arms, each having a first generally planar portion extending in a generally radial direction with respect to said central axis and each having a second generally planar portion extending longitudinally in a direction parllel to said central axis;

each of said first portions having a first end for connection to an external support structure, having a second end attached to a longitudinally extending edge of an intermediate section of one of said second portions, and extending radially outward from one of said second portions;

each of said second portions including a first end and a tab extending from a second end;

said first end of each of said second portions being rigidly attached to a first end bell positioned at one end of said stator stack;

a plurality of tab receptacles rigidly attached to a second end bell positioned at a second end of said stator stack, wherein said second end bell is spaced from said first end bell to expose a central portion of said stator stack, said intermediate section of each of said second portions lying adjacent to the exposed portion of said stator stack, and said tab receptacles each having an opening into which one of said mounting arm tabs extends;

wherein the width of the second portion of each of said mounting arms in a circumferential direction is substantially greater than the thickness of the second portion of each of said mounting arms in a radial direction; and wherein the width of the first portion of each of said mounting arms in a longitudinal direction is substantially greater than the thickness of the first portion of each of said mounting arms in a circumferential direction.

9. An electric motor as recited in claim 8, wherein each of said tab receptacles comprises:

a bent pad having a radially extending section which defines said opening and having a longitudinally extending section which is rigidly attached to one of said end bells.

10. An electric motor as recited in claim 8, wherein each of said tab receptacles comprises:

a lanced section of one of said end bells, said lanced section being radially displaced to form said opening.

11. An electric motor as recited in claim 8, wherein the tab on said second portion of each of said mounting arms has an arcuate cross section.

12. An electric motor as recited in claim 8, wherein the second portion of each of said mounting arms is spaced from a surface of said motor in a radial direction.

13. An electric motor as recited in claim 8, wherein each of said mounting arms is formed from a single piece of sheet metal having a bend between said first and second portions.

* * * * *